US008260336B2

(12) United States Patent
Johansson et al.

(10) Patent No.: US 8,260,336 B2
(45) Date of Patent: Sep. 4, 2012

(54) METHOD FOR COMPENSATING A RADIATION BEAM BY BEAM STEERING

(75) Inventors: Martin Johansson, Mölndal (SE); Sven Oskar Petersson, Sävedalen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 240 days.

(21) Appl. No.: 12/665,627

(22) PCT Filed: Jun. 21, 2007

(86) PCT No.: PCT/EP2007/056201

§ 371 (c)(1), (2), (4) Date: Dec. 18, 2009

(87) PCT Pub. No.: WO2008/154959

PCT Pub. Date: Dec. 24, 2008

(65) Prior Publication Data

US 2010/0311457 A1 Dec. 9, 2010

(51) Int. Cl.
*H04B 7/00* (2006.01)

(52) U.S. Cl. ......... 455/517; 342/372; 342/378; 370/329

(58) Field of Classification Search ............... 455/562.1, 455/517; 342/372, 360, 368, 365, 378; 375/267; 370/329

See application file for complete search history.

(56) References Cited

U.S. PATENT DOCUMENTS

| | | | | |
|---|---|---|---|---|
| 5,623,270 | A | 4/1997 | Kempkes | |
| 5,894,291 | A | 4/1999 | Lee | |
| 6,333,712 | B1 | 12/2001 | Haugse | |
| 6,680,697 | B2 * | 1/2004 | Bruzzone et al. | 342/372 |
| 2007/0229378 | A1 * | 10/2007 | Clark | 343/757 |

FOREIGN PATENT DOCUMENTS

EP 1562257 A 8/2005

* cited by examiner

*Primary Examiner* — Phuoc Doan
(74) *Attorney, Agent, or Firm* — Rothwell, Figg, Ernst & Manbeck, P.C.

(57) ABSTRACT

The present invention relates to methods for adjusting a radiation beam pattern of an antenna arrangement providing coverage in an area. The antenna arrangement comprises an antenna having at least one array of antenna elements connected to a distribution network configured to generate the radiation beam pattern. The method comprises: arranging the antenna elements of said array in at least one column in an antenna plane in relation to a reference plane, each column comprising multiple antenna elements arranged in at least two sub-panels; arranging a motion sensor to the antenna arrangement, said motion sensor is configured to detect deviation of the antenna elements relative the reference plane; and adjusting a beam shape of the radiation beam pattern based on the detected deviation of the antenna to maintain coverage in the area by controlling the distribution network. The invention also relates to an antenna arrangement and base station.

20 Claims, 10 Drawing Sheets

METHOD FOR COMPENSATING A RADIATION BEAM BY BEAM STEERING

CROSS REFERENCE TO RELATED APPLICATION

This application is a 35 U.S.C. §371 National Phase Application from PCT/EP2007/056201, filed Jun. 21, 2007, and designating the United States.

TECHNICAL FIELD

The present invention relates to a method, and a system, for compensating a radiation beam of an antenna structure when the antenna structure is subject to motion, i.e. movement or displacement.

BACKGROUND

In many cases antennas are installed to non-rigid or non-stationary structures, the motion of which may result in time-varying antenna orientation as the structure is exposed to various forces. Consequently, the direction of the radiation pattern of such an antenna (for example as measured with respect to the main beam peak, for a directional antenna) will also vary over time. One example of such an installation case is when an antenna is mounted on a mast or tower which moves (sways) when exposed to varying wind conditions (wind load). Typically, this motion results in both a translation and a rotation of the antenna. Maximum antenna sways are on the order of ±1 degree (or smaller) for typical base station antenna installations.

The extent to which the antenna motion influences system performance depends on several things, the most important of which may be the antenna elevation beamwidth, when considering the rotation aspect of motion. When the antenna rotation angle, and the corresponding beam-squint, is significantly less than the elevation beamwidth (in the plane of beam-squint), its effects on system performance can typically be ignored. This is the case for almost all antenna installations used in existing base stations for cellular communications systems. However, in order to improve coverage, one increasingly popular solution is to use antennas with higher gain compared to typical gain figures of conventional basestation antennas. These new higher gain antennas are often realized with very narrow elevation half-power beamwidths. An example of such antennas is disclosed in the published international patent application WO 2006/065172 (reference [1]), assigned to Telefonaktiebolaget LM Ericsson.

Narrow elevation beamwidths accentuate the effects of antenna (mounting structure) motion and may cause problems if not carefully dealt with. There are already existing antenna installations in which mast motion is taken into account when choosing installation height. One example is radio link antennas, which in some cases are intentionally installed at positions on the mast or tower where rotation is low, e.g. midway between the mounting structure resonance nodes, in order to ensure link transmission quality.

The translation aspect of antenna structure motion can typically be ignored, since the translation is relatively low-speed and therefore produces negligible translation-dependent effects (for example Doppler shift).

For a given mast or tower structure, it may not be possible (or suitable) to use an antenna with a desired, narrow, elevation beamwidth, because of the risk of motion-related performance degradation.

The complementary problem description is that the installation and use of a desired narrow-beam antenna may require a more rigid (expensive) mast or tower structure, or an antenna installation height that is suboptimal under ideal conditions but necessary to ensure desired performance under non-ideal conditions.

A solution to this problem is disclosed in U.S. Pat. No. 5,894,291 (reference [2]), which shows a method for dynamically counteracting antenna tower sway by modifying an antenna drive signal so as to electrically steer an active antenna mounted on said tower towards a desired direction. Furthermore, it discloses one or more motion sensors configured to detect antenna tower motion, as illustrated in FIG. 1.

A problem with the prior art [2] is that the method only compensate for antenna structure motion, i.e. the antenna tower. The motion of the antenna may differ from motion in the antenna structure since the sway/tilt of antenna may not be deterministically dependent on the sway/tilt of the mounting structure (tower/mast), particularly not for installation on different types of structures. Compensation by redirecting the beam is only achieved for a rotational movement in the direction of the beam, as illustrated by FIGS. 2*a* and 2*b*.

Thus, there is a need to provided a more sophisticated method for compensate antenna motion.

SUMMARY

An object with the present invention is to provide a method that in view of the antenna motion adjusts a radiation beam pattern of the antenna to reduce the antenna performance sensitivity compared to prior art.

A solution to the object is achieved by providing means to adjust the beam shape of the beam. This may be achieved by providing means to divide the antenna into a number of sub-panels in at least one column, each sub-panel having at least one antenna element and communicating through a common feed point with a distribution network. One or more motion sensors are arranged to the antenna arrangement, and are configured to detect deviation of the antenna relative a reference plane. The antenna elements are arranged in an antenna plane which is arranged in relation to the reference plane. The detected deviation is used to adjust the beam shape of the radiation beam pattern.

Another object with the present invention is to provide a method for compensating the radiation beam pattern of the antenna due to an in-plane rotational motion of the antenna.

A solution to the object is achieved by providing means to compensate the radiation beam pattern. This may be achieved by providing means to divide the antenna into a number of sub-panels in at least two parallel columns, each sub-panel having at least one antenna element and communicating through a common feed point with a distribution network. One or more motion sensors are arranged to the antenna arrangement, and are configured to detect an in-plane rotational motion relative a reference direction in an antenna plane in which the antenna elements are arranged. The in-plane rotational motion is used to compensate the radiation beam pattern.

An advantage with the present invention is that cheaper or simpler mounting structures may be used since the antenna motion may be compensated.

Further objects and advantages are apparent to a skilled person in the art from the detailed description.

DETAILED DESCRIPTION

Figure 1:
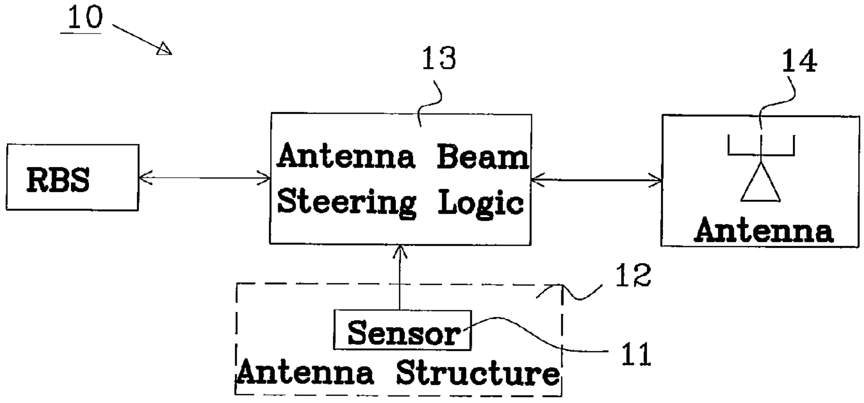
Fig. 1 (Prior art)
FIG. 1 shows a prior art beam steering arrangement to dynamically counteracting antenna tower sway.

FIG. 1 describes a prior art beam steering arrangement 10 to counteract antenna tower sway. One or more sensors 11 are arranged to an antenna structure 12. The detected swaying of the antenna structure 12 is used to control the antenna beam steering logic 13 to dynamically adjust the beam by modifying the drive signal from a Radio Base Station (RBS). The modified drive signal is provided to the antenna elements of the antenna 14.

Figure 2A:
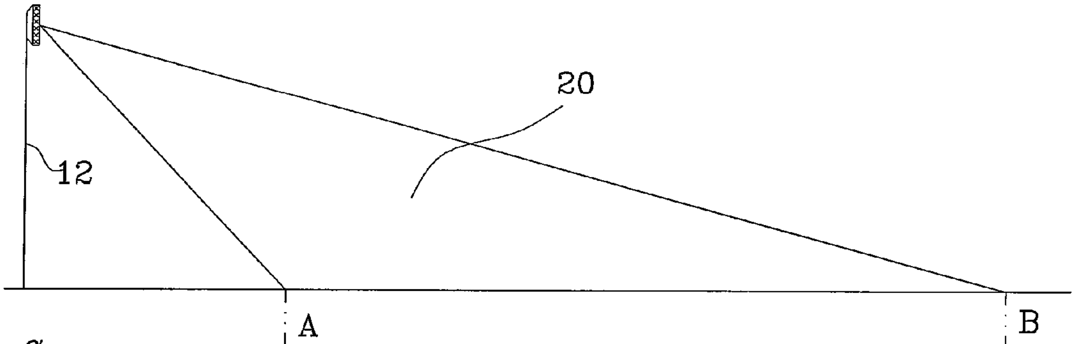
FIGS. 2*a* and 2*b* show the effect on antenna coverage due to antenna sway.

FIG. 2*a* illustrates the antenna coverage of an unaffected (non-swaying) antenna structure 12, i.e. the antenna elements are arranged in a vertical reference plane. The antenna beam pattern 20 covers an area extending from point A to point B.

Figure 2B:
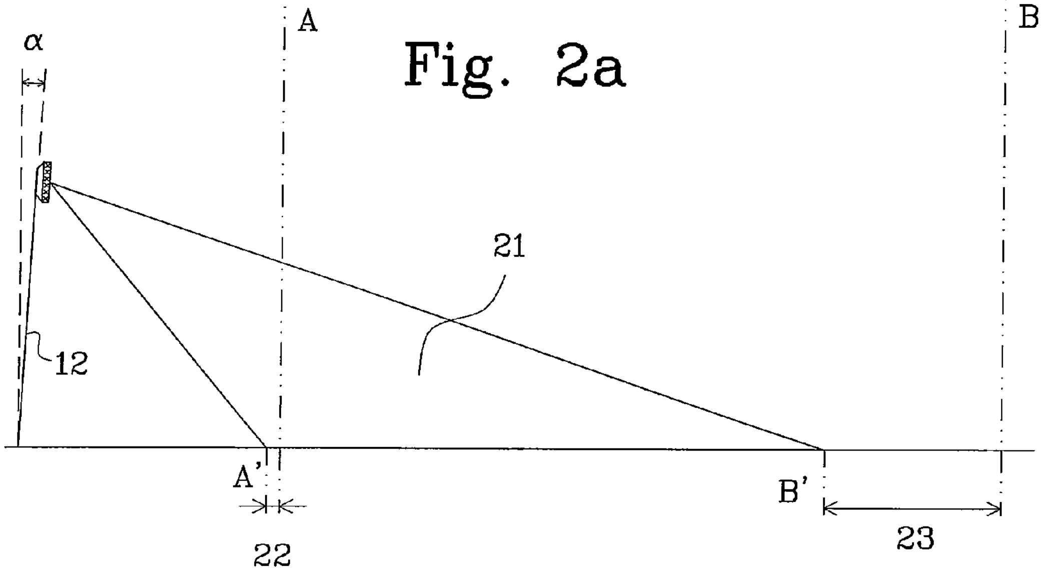

FIG. 2*b* illustrates the antenna coverage of an affected (swaying) antenna structure 12, i.e. the antenna elements are tilted forward an angle α. The tilted antenna beam pattern 21 covers an area substantially smaller than for an unaffected antenna structure. Point A in FIG. 2*a* is moved a small fraction closer to the antenna structure, as illustrated by point A'. The difference between point A and point A' is denoted 22. Point B in FIG. 2*a* is moved considerably closer to the antenna structure 12, as illustrated by point B'. The difference between point B and B' is denoted 23. Any mobile unit present in the area denoted 23 will experience a reduction in availability, or even lose the possibility, to communicate with the RBS. The antenna arrangement according to the invention differs from the prior art in that an antenna-integrated or antenna-mounted sensor is provided. This is critical, since a mast-mounted sensor will not necessarily provide the correct pointing direction of an antenna, given the multitude of possible vibration modes present in a mounting structure. The invention also solves the problem of antenna motion, and not "antenna tower motion".

In an antenna system composed of several sub-arrays or sub-panels, the change in beam direction due to antenna (mounting structure) motion may be compensated for by means of beam steering.

Information regarding rotations and translations, which are detected by means of one or more sensors being a part of the compensation system, is used to adjust the beam pointing direction and/or beam shape.

One can imagine a number of different implementations ranging from simpler ones, working in one spatial dimension only and where the antenna consists of two sub-panels (a sub-panel is a sub-array of antenna elements with common reference/feed point), to more sophisticated ones working in two or more dimensions and where the antenna consists of several sub-panels.

Figure 3A:
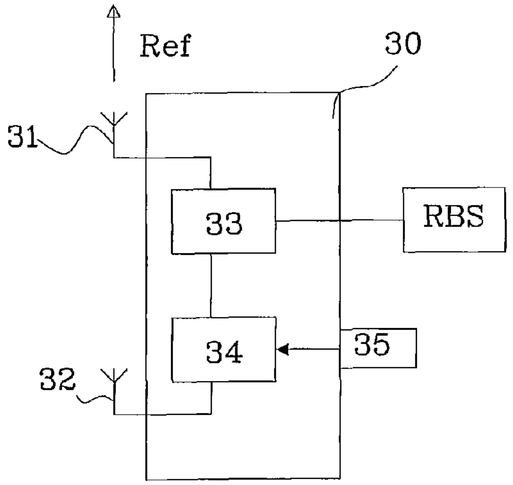
FIGS. 3*a* and 3*b* show a first and second embodiment of the present invention.

FIG. 3*a* shows an example of a simple implementation of an antenna 30 having two sub-panels 31, 32 arranged in a reference plane Ref where a fixed transmission-line feed network is replaced with a feed network 33 where one of the branches is equipped with a variable phase shifter 34, or a variable time delay unit. The antenna 30 is retrofitted with an external motion sensor 35, configured to detect deviation of the antenna elements in the sub-panels 31, 32 relative the reference plane Ref, and a beam shape of the generated radiation beam pattern is adjusted based on the detected deviation of the antenna 30 using the phase shifter 34 to maintain communication with a mobile unit.

Figure 3B:
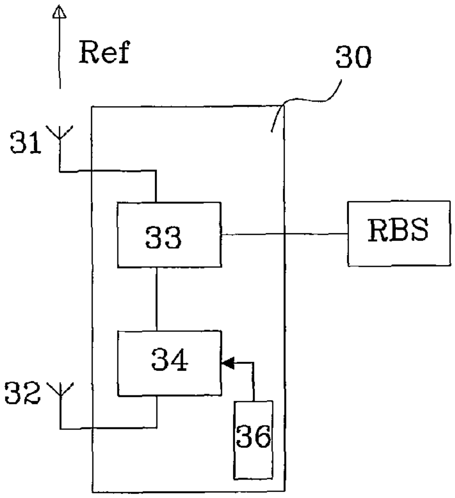

FIG. 3*b* shows a similar implementation of same antenna as described in connection with FIG. 3*a*. A motion sensor 36 is integrated into the antenna 30, configured to detect deviation of the antenna elements in the sub-panels 31, 32 relative the reference plane Ref.

The number of radio chains is not affected and the adjustment (compensation) is performed on RF (Radio Frequency). The compensation unit (motion sensor) can be seen as an "add-on" to the antenna, either integrated with the antenna, as shown in FIG. 3*a*, or mounted on the antenna structure, as shown in FIG. 3*b*.

The compensation is automatic and is independent of control signaling from RBS or higher level network control centers. In fact, the compensation is invisible to the overall system, except in the sense that it alleviates the gain sensitivity to mounting structure pointing errors in given reference directions.

Numerical Example

Forward Tilt

A numerical example showing how the invention will work for a realistic antenna configuration is presented here when the antenna motion compensation is performed using a phase shifter or time delay unit.

Figure 4A:
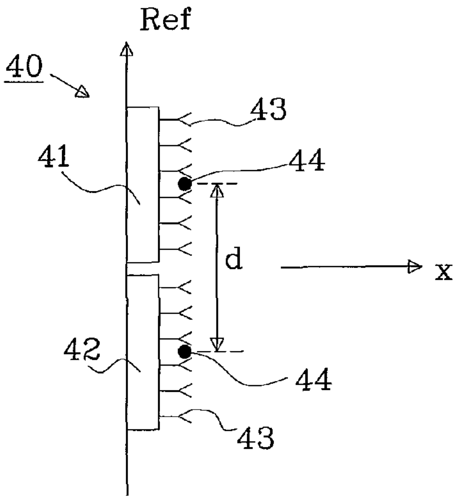
FIGS. 4*a* and 4*b* show a numerical example of the invention in forward tilt.
Figure 4B:
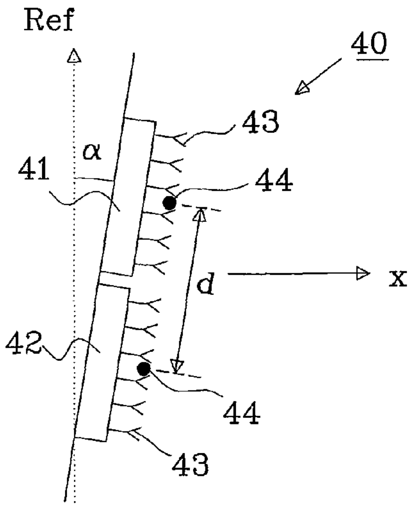

Assume that we have an antenna with a linear separation distance d between the antenna sub-panels, see FIGS. 4*a* and 4*b*. Assume further that the nominal carrier frequency is f and that the mechanical (spatial) angle displacement (rotation) is α.

FIGS. 4*a* and 4*b* show a schematic drawing of antenna 40 comprising two sub-panels 41, 42 with a separation distance d shown for non-rotated (reference) antenna installation in FIG. 4*a*, and rotated antenna installation with angle displacement α in FIG. 4*b*. The black dots indicate the imagined phase centres 44 of the respective sub-panels. Each sub-panel comprises six antenna elements 43.

The antenna 40 (and its elements 43) is ideally arranged along a vertical axis in a reference plane Ref, see FIG. 4*a*. A beam reference direction x is chosen in the horizontal plane, in a direction broadside to the (imagined) aperture of the antenna 40, when the antenna is vertical. It is preferred to maintain the phase difference (possibly zero degrees) between the radiation patterns of the sub-panels 41, 42 in the beam reference direction x also over an interval of small angle displacements α (α<<1 radian), i.e. the radiation patterns of the sub-panels needs to be co-phased in the beam reference direction x when antenna is tilted forward.

The difference in path length in the beam reference direction for rays emanating from the phase reference points (or center) of the two sub-panels is d sin(α). Expressed as phase Φ (and ignoring bandwidth), this becomes $$\Phi=2\pi d \sin(\alpha) f/c.$$

Choosing a sample antenna with f=1.9 GHz and d=2.5 m, and letting α<<1 radian, this can be written $$\Phi\approx 95*\pi/3\alpha\approx 100\alpha \text{ (rad)}.$$

Thus, the theoretically largest angle displacement α that can be compensated for, without a grating lobe becoming the dominant beam, is $\alpha_{max}$=±180/100=±1.8 degrees. Practical limitations, such as the onset of grating lobes, will reduce $\alpha_{max}$. In the case discussed, the practical maximum compensation angles may be about ±1 degree.

Figure 5:
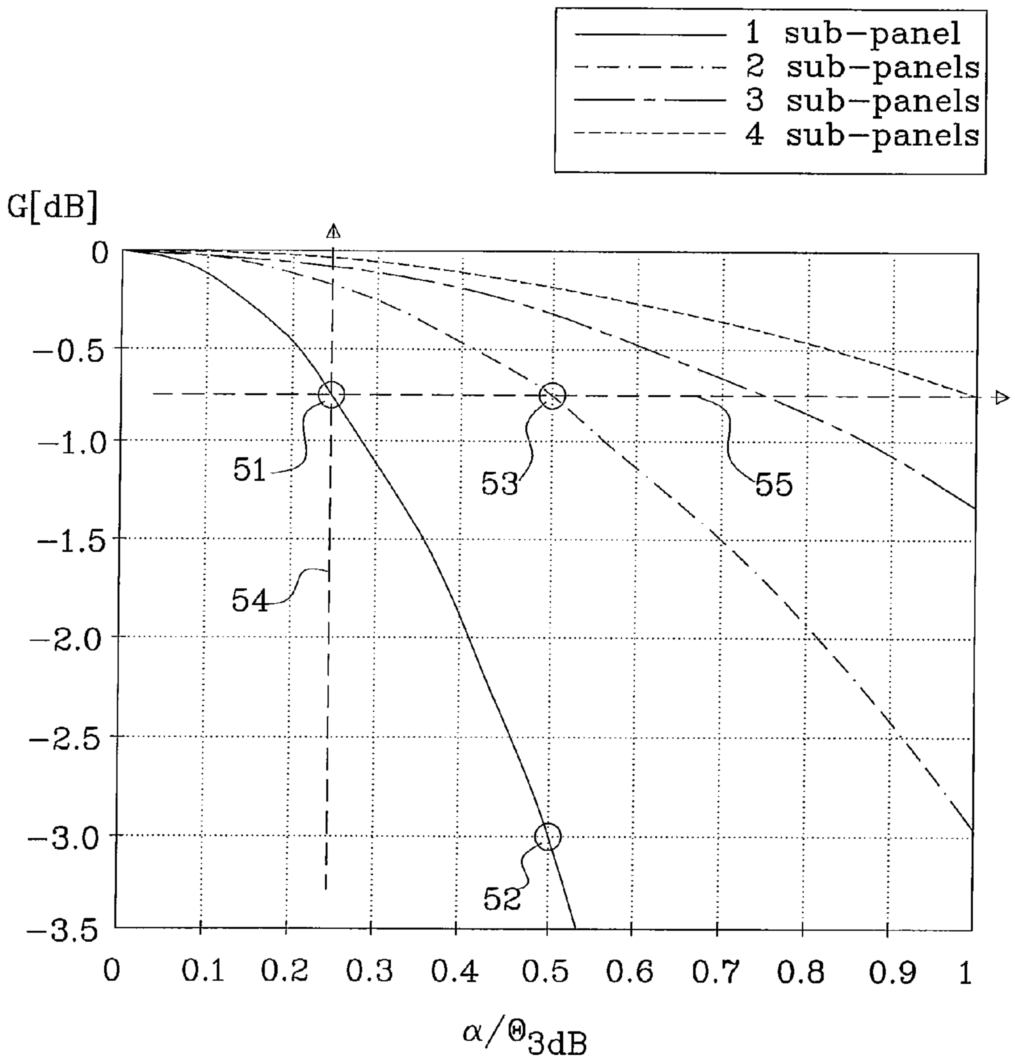
FIG. 5 shows a graph illustrating the numerical example in FIGS. 4*a* and 4*b*.

Note that a given maximum theoretical compensation angle may suffice for angle displacements that are larger than maximum compensation angle. Already antennas without angle displacement compensation have gain performance in direct proportion to the beamwidth, when exposed to displacements. Thus, antennas equipped with compensation equipment according to the invention will add a displacement tolerance to the already existing built-in tolerance deriving from finite radiation pattern beamwidth. The relationship between relative antenna displacements, antenna size, sub-panel separation, and relative gain in a beam reference direction is illustrated in FIG. 5, which gives a "universal" description of the relative gain as a function of relative antenna rotation angle. FIG. 5 shows the relative gain G as a function of relative antenna rotation angle, calculated when all sub-panels are co-phased in the beam reference direction.

The relative gain is calculated in the direction having maximum gain for the corresponding non-rotated antenna, see FIG. 4*a*. Relative rotation angle is antenna rotation angle α divided by antenna half-power beamwidth $\theta_{3\ dB}$. The different curves represent antenna implementations with different number of sub-panels. A Gaussian beam is used as the model for the relative antenna gain G of a tilted antenna, $$G=-12([\theta-(90+\alpha)]/\theta_{3\ dB})^2,$$

which is a good approximation of the beam shape for small angles. Here, G is in dB, θ is the observation direction, and $\theta_{3\ dB}$ is the half-power beamwidth.

Three enumerated positions (encircled) serve to explain the content of the graph. The first position, 51, shows the relative gain in the beam reference direction for an antenna consisting of one sub-panel that has been rotated one-fourth of a half-power beamwidth. This corresponds to a gain drop of 0.75 dB. If the pointing direction is maintained but the antenna (and sub-panel) is made twice as large, we end up at the second position, 52, where the gain drop is 3 dB (compared to the maximum gain of the new, larger antenna), which follows from the Gaussian beam model. If the new, larger antenna is divided into two sub-panels that can be individually phase-adjusted relative to each other (or "time-delayed"), we end up at the third position, 53, where again the relative gain is −0.75 dB. This relative gain is of course related to the gain of the larger antenna, so the absolute gain in the third position, 53, is 3 dB higher than the gain in the first position, 51. In other words, even though the antenna represented by the third position, 53, is twice as large as the antenna represented by the first position, 51, and therefore has half as wide half-power beamwidth, the gain increase of 3 dB can be maintained even in the presence of antenna rotations (mounting structure movements).

Note that moving vertically between the curves representing different numbers of sub-panels corresponds to maintaining constant total antenna length (size). Thus, in the direction of increasing number of sub-panels (along arrow 54), the sub-panel length, and separation distance, are reduced and, hence, the scan loss due to the sub-panel pattern is reduced.

Moving horizontally between the curves representing different numbers of sub-panels corresponds to maintaining constant sub-panel length (size). Thus, as we go in the direction of increasing number of sub-panels (along arrow 55), the total antenna length increases and, hence, the absolute antenna gain increases, while keeping the relative gain performance constant.

Figure 6:
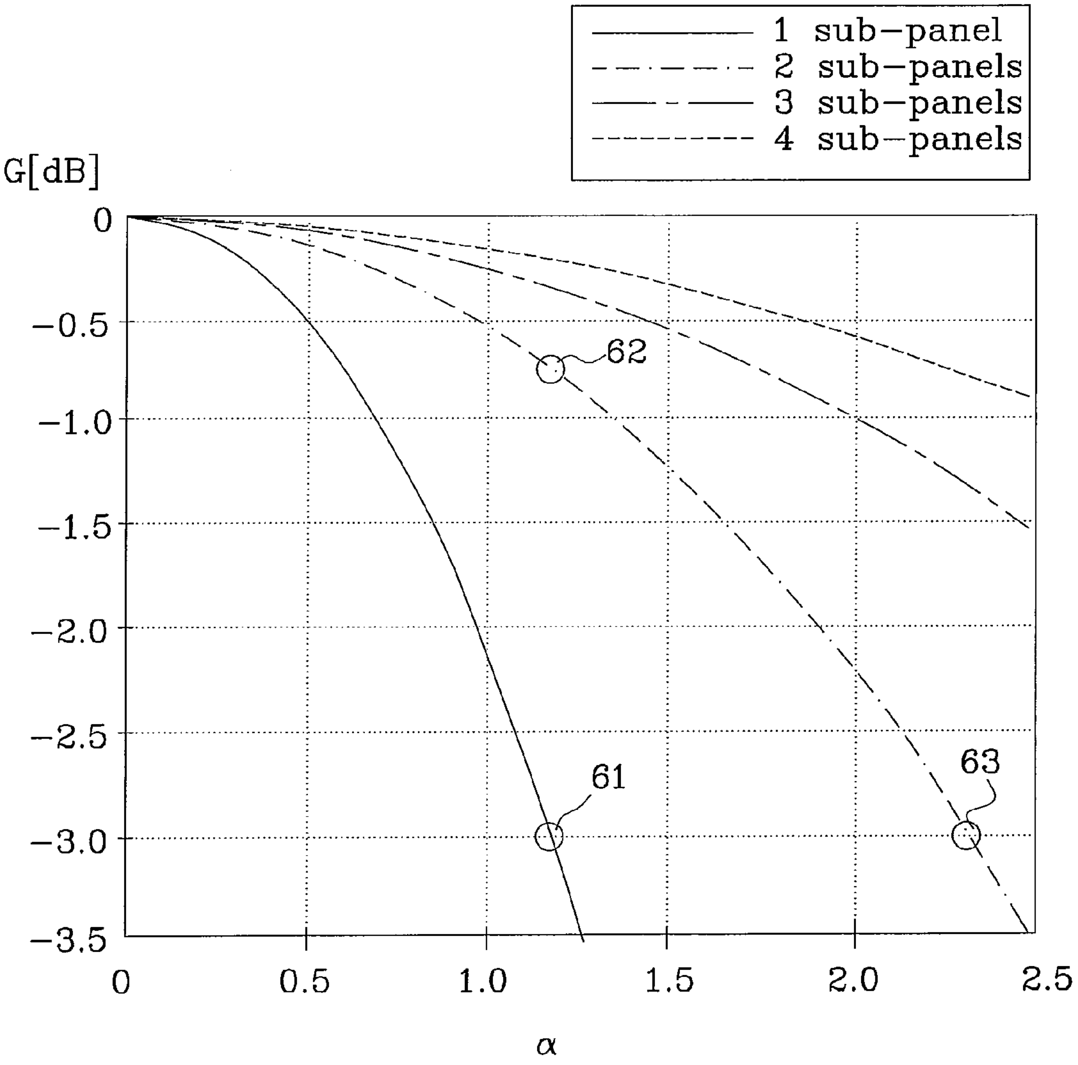
FIG. 6 shows a graph illustrating the effect of the invention on a specific antenna.

In FIG. 6, the general principles of FIG. 5 are applied to a specific antenna. The relative gain performance for a sector-type antenna with a given antenna length (for example vertical length) is shown as a function of antenna rotation angle. The antenna is twenty two (22) wavelengths long and consists of twenty four (24) equally-spaced radiating elements. Four different cases are considered which differ in the way the antenna is partitioned: with one, two, three, and four sub-panels, respectively, the sub-panels being uniform linear arrays with 24/(number of sub-panels) elements each. A uniform linear array (ULA) is here defined as being an array antenna with elements equi-spaced along a line in which all elements are radiating with identical amplitude and phase.

For the purposes of gain calculation, we define the beam reference direction as a direction in the horizontal plane, and consider the antenna rotation angle to be zero when the antenna elements are located along a vertical axis in a reference plane (corresponding to installation on a vertical mounting structure). Furthermore, the antenna pointing direction is along the beam reference direction when the antenna rotation angle is zero.

The result for the case with one sub-panel, i.e. the entire antenna is a ULA, is given by the solid (lowest) curve. Since this case has no means for co-phasing the antenna, the curve also represents a sample of the main beam as a function of angle. Thus, the half-power beamwidth can be read from the curve to be approximately 2.35 degrees. For a leaning mounting structure producing an antenna rotation angle α of about 1.18 degrees (one half of the half-power beamwidth), there is then a 3 dB drop in gain in the beam reference direction x, at position 61 in FIG. 6.

The case with two sub-panels, the second lowest curve, provides a good example of the advantages of the invention. For example, comparing the relative gain of the single sub-panel case with the case with two sub-panels for a rotation angle of 1.18 degrees, an improvement of 2.25 dB is obtained by doubling the number of sub-panels and co-phasing the two sub-panels in the beam reference direction x. Instead of a 3 dB gain drop, there is a now a mere 0.75 dB gain drop for this particular antenna rotation angle, as illustrated at position 62. Alternatively, comparing the corresponding antenna rotation angles of the single sub-panel case with the case with two sub-panels for a relative gain of −3 dB, we see that the antenna rotation angle must be twice a large for the case with two sub-panels to produce the same gain drop, as illustrated at position 63.

Similar comparisons can be made for larger numbers of sub-panels, the limit being that there are as many sub-panels as there are elements. However, typically, the marginal rate of return in gain improvement becomes too low to warrant further partitioning of the antenna already when the sub-panels contain a number of elements significantly larger than one.

Another interesting feature of the invention can be noted in connection with FIGS. 5 and 6: given a known specification of the structural rigidity (stiffness and maximum "twist") of a mounting structure (tower or mast, for example), and given a desired antenna gain and corresponding half-power beamwidth, the required number of sub-panels necessary to obtain a desired maximum gain drop (when applying the solution of the invention) is directly available.

When an antenna moves or, rather, tilts in a direction in the plane of the antenna aperture, i.e. in-plane rotational motion, the main beam pointing direction (for a uniform linear array) is unaffected, which means that the coverage (derived from the antenna gain) is also maintained in said direction. However, for other directions the coverage will be affected. For example, a system using an antenna with narrow elevation half-power beamwidths, see FIGS. 7*a* and 7*b*, may experience significant coverage loss at azimuth (horizontal) angles away from the main beam peak as a result of the direction dependence of the antenna. For a given global elevation angle, the antenna pattern directivity will change with azimuth angle, not only as a result of the inherent azimuth pattern but also because different elevation angles of the antenna-fixed coordinate system are sampled.

Figure 7A:
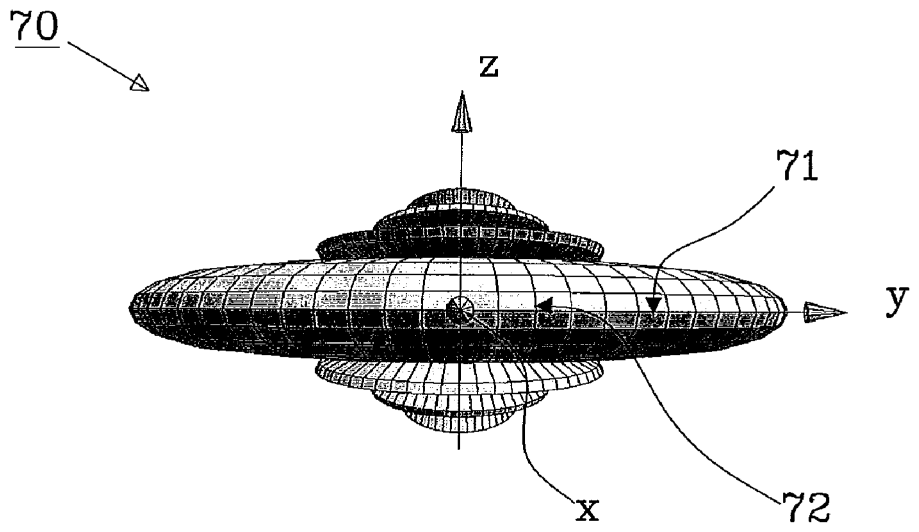
FIGS. 7*a* and 7*b* show spherical plots of pattern for an antenna installed vertically with nominal unrotated and rotated aperture, respectively.
Figure 7B:
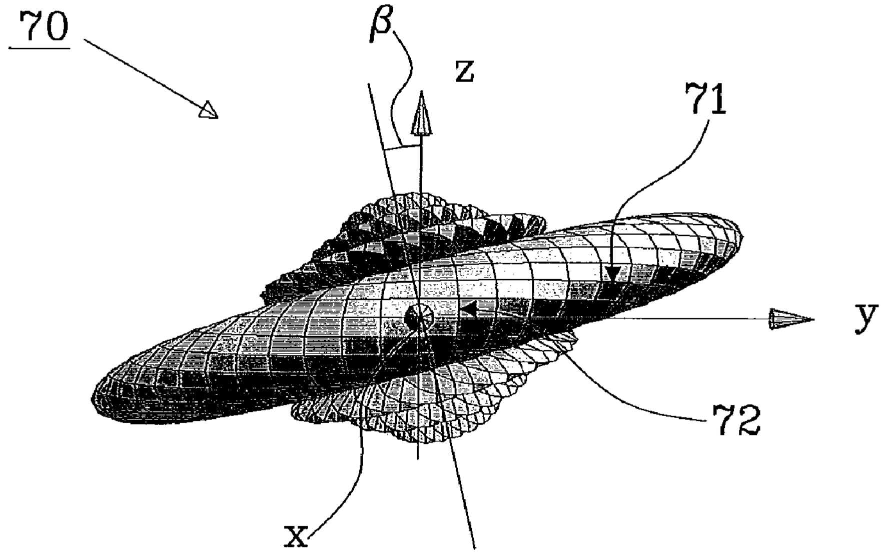

FIG. 7*a* shows a spherical plot of pattern 70 of an antenna installed vertically with nominal unrotated aperture and FIG. 7*b* shows a spherical plot of pattern 70 of the same antenna with rotated aperture. The aperture rotation has been applied around the antenna aperture normal vector (x-axis), i.e., the antenna has a "roll angle $\beta$" different from zero. View is along negative x-axis. Overlaid grid represents constant elevation 71 and azimuth 72 angles.

The change in beam direction due to antenna motion using a cheaper or simpler mounting structure can be compensated for by means of "antenna motion compensation" equipment according to the invention. The invention thus gives a solution for maintaining good coverage in for example a wireless communications system using antennas with narrow half-power beamwidths.

The effect of the compensation according to the invention depends on system characteristics such as beamwidths in both azimuth and elevation and the complexity of the compensation equipment. In a simple embodiment with antenna sub-panels arranged vertically above each other, it will be possible to compensate for antenna motions aligned with the beam direction.

Figure 8:
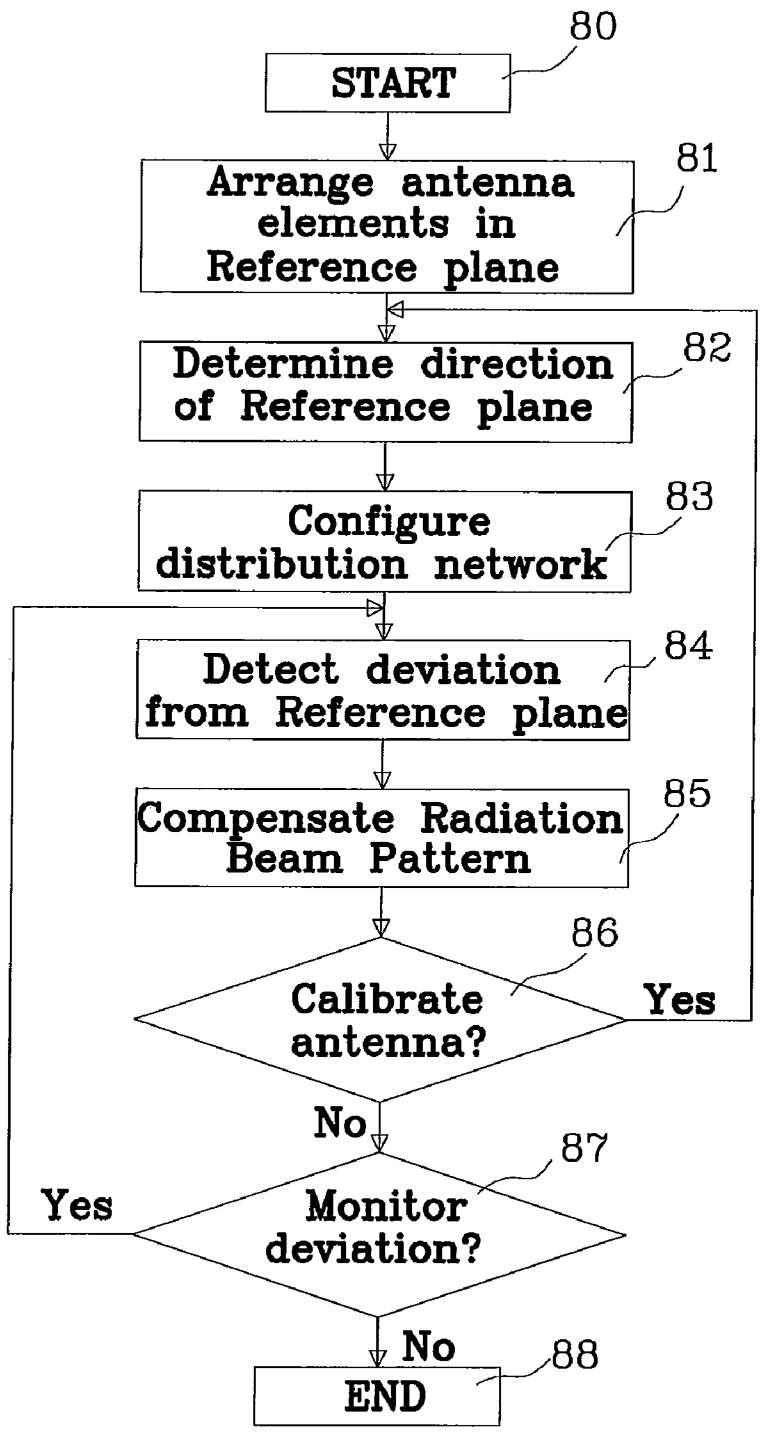
FIG. 8 shows a flowchart for the process according to the invention

FIG. 8 shows a flow chart illustrating the inventive concept. The process starts at step 80 and continues to step 81, in which antenna elements of the antenna are arranged in at least one column in a reference plane. In the following step 82 a nominal vertical direction is determined relative to the reference plane before the distribution network is configured to adjust the radiation beam pattern of the antenna arrangement to obtain a desired main direction of the beam by controlling the distribution network (step 83) in order to provide coverage in an area. Steps 82 and 83 may be used to initiate the antenna arrangement during installation, or may be used to calibrate the antenna arrangement, preferably at regular intervals, to maintain the desired main direction and radiation beam pattern, i.e. coverage in the area.

A motion sensor is provided in step 84 which is configured to detect deviation of the antenna elements relative the reference plane and/or in-plane rotational motion of the antenna elements relative a reference direction in the reference plane. The motion sensor could be integrated in the antenna, or be externally attached to the antenna.

In a first case when a deviation relative the reference plane is detected, as described in connection with FIGS. 4*a* and 4*b*, only one column of antenna elements is needed. In a second case when an in-plane rotational motion relative the reference plane, as described in connection with FIGS. 7*a* and 7*b*, is detected at least two columns of antenna elements are needed. Both cases require that:

each column comprises multiple antenna elements arranged in at least two sub-panels, and each sub-panel communicates through a common feed point with the distribution network.

The process continues to step 85, in which the beam shape of the radiation beam pattern is adjusted based on the detected deviation of the antenna and/or the radiation beam pattern is compensated based on the detected in-plane rotational motion of the antenna elements. One or more control signals provide the required information from the motion sensor to the distribution network, especially if the motion sensor is an externally attached device.

In the first case, the beam shape is preferably adjusted by tapering the excitation of the array of antenna elements on sub-panel basis. This may for example be accomplished by controlling the distribution network in such a way that the number of active sub-panels in each column is changed. One possibility is to accomplish this by selectively activating or deactivating (depending on state of sub-panel excitation) at least one sub-panel in each column. Another possibility is to divide the antenna elements into another number of sub-panels, for example 3 sub-panels instead of 2 sub-panels. It is preferred that each sub-panel has a fixed number of antenna elements, but it is possible to configure the distribution network in such a way to make it possible to change the number of antenna elements in each sub-panel. A one-dimensional array of antenna elements having two sub-panels will produce a beam shape and if one of the sub-panels are inactivated in response to antenna motion, the resulting beam shape of the array (with only one sub-panel activated) will provide a wider beam but a lower maximum gain. An inactivation of a sub-panel can be realised by redistributing the power through amplitude control in the distribution network. It is also possible to alter the beam shape by changing phase/time-delay in the distribution network. For instance in an antenna with three sub-panels arranged in a single column, phase-shift/time-delay is applied to the sub-panel in the middle. By symmetry, this cannot produce steering of the beam, but it will affect how the radiation from the different sub-panels adds together in different directions. Thus, it produces a change in beam shape.

In the second case, the radiation beam pattern is preferably compensated by applying phase and/or amplitude taper in a nominal horizontal direction of the antenna, the taper being applied differently over the sub-panels in each column.

In a preferred embodiment each sub-panel has an effective phase centre and said step of compensating the radiation beam pattern comprises selectively activating sub-panels to obtain alignment of effective phase centres mainly along a reference direction, preferably the nominal vertical direction.

In an alternative embodiment, the antenna elements in at least one of the columns are parasitic antenna elements, the step of compensating the radiation pattern comprises changing the electromagnetic properties of the passive antenna elements.

When the radiation beam pattern has been compensated in step 5, the process continues to step 86. A decision is made in step 86 whether antenna calibration is going to be performed or not. If antenna calibration is selected, the flow is fed back to step 82, in which the direction of the reference plane is determined again and the distribution network is configured to generate coverage in a desired area (step 83). On the other hand if calibration is not selected, the process continues to step 87, in which a decision is made whether to continue monitor deviation/in-plane rotation or not. Normally, the process continues to monitor the deviation and/or in-plane rotation which is indicated by the feedback line to step 84. In other cases, the process ends in step 88.

As illustrated in FIG. 8, both forward tilt and sideways tilt may be individually monitored or monitored together.

Numerical Example

Sideways Tilt

Figure 9A:
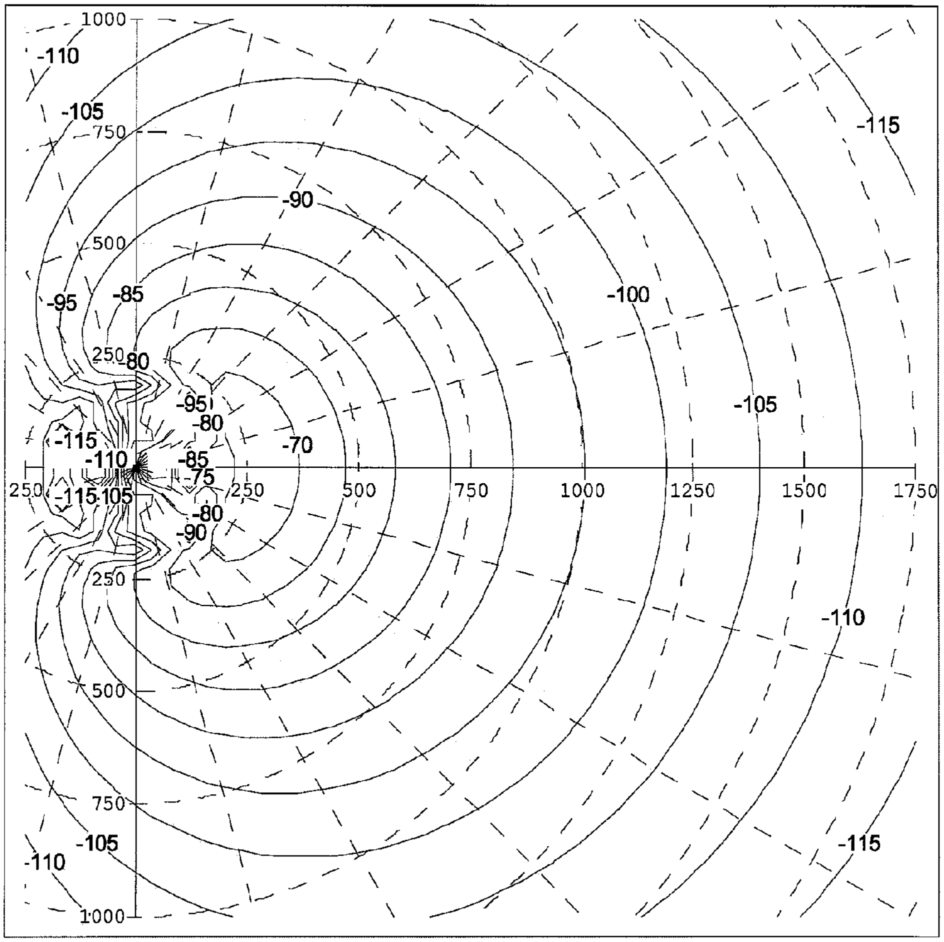
FIGS. 9*a*-9*c* show the effect on coverage performance of the rotation as shown in FIGS. 7*a* and 7*b*.
Figure 9B:
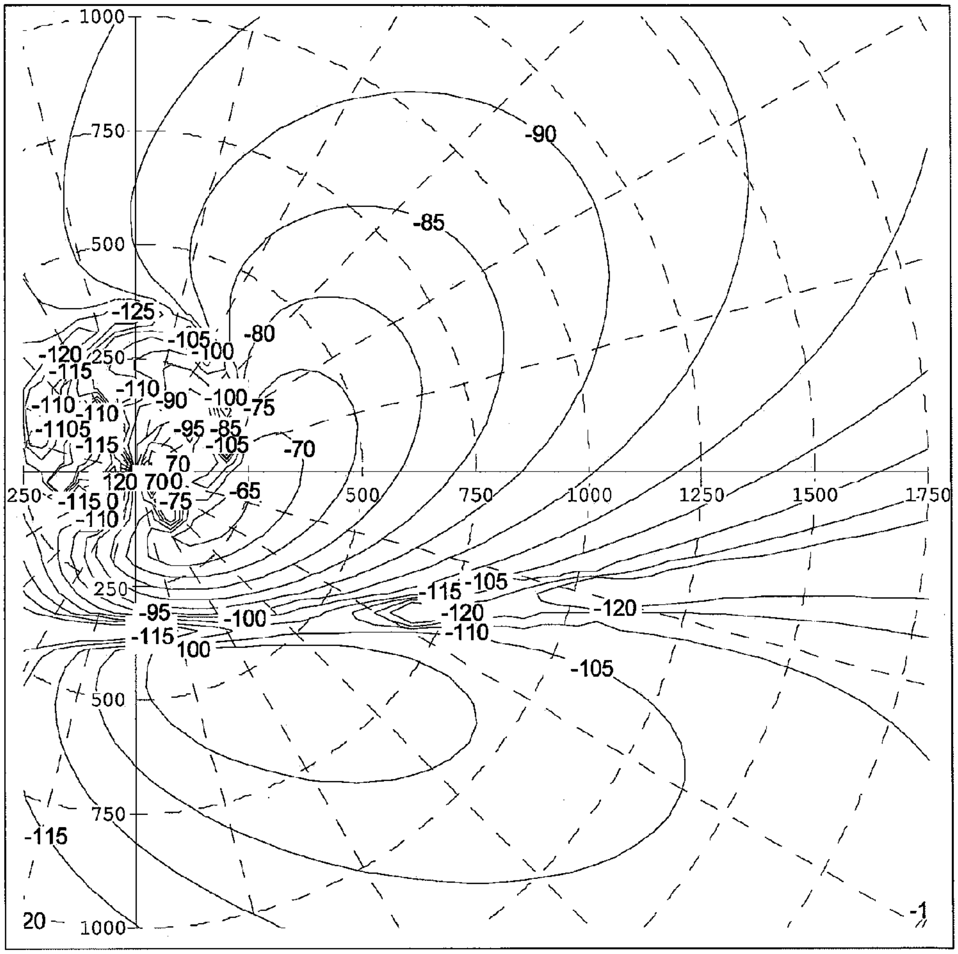
Figure 9C:
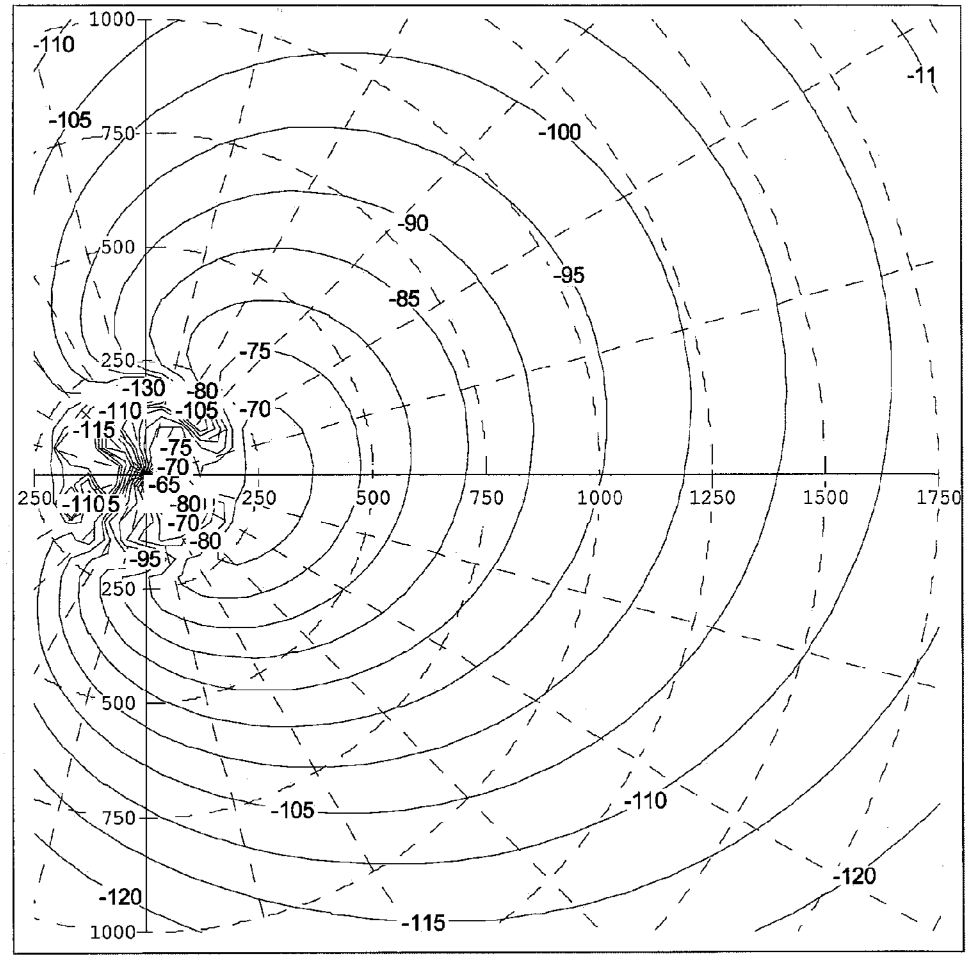

The effect on coverage performance of a rotation as shown in FIG. 7 is shown in FIG. 9*a*-9*c* for three difference cases. FIG. 9*a* shows an ideal antenna installation, reference case, FIG. 9*b* shows an uncompensated rolled antenna installation, and FIG. 9*c* shows a compensated according to the invention rolled antenna installation.

FIG. 9*a* shows iso-coverage contours (signal strength [dB]) for antenna with ideal installation, i.e., without roll error present.

FIG. 9*b* shows iso-coverage contours (signal strength [dB]) for antenna with roll error present and no compensation applied.

FIG. 9*c* shows iso-coverage contours (signal strength [dB]) for antenna with roll error present and compensation according to the invention applied.

The novel idea behind the results shown in FIGS. 9*a*-9*c* is based on applying phase and/or amplitude taper in the nominally horizontal direction of the antenna (this requires at least two element or columns in the case of an array antenna, but can be realized by other means for other antenna layouts), the taper being applied differently over different parts (in elevation) of the antenna. By applying taper, the variations in the effective antenna pattern, as related to an Earth-fixed coordinate system, can be kept to a minimum, thus providing antenna-orientation (roll angle) independent coverage performance.

One basic form of the idea is to shift aperture excitation centre point of two vertical halves of an antenna such that the aperture excitation centre points become aligned along a reference direction, preferably a vertical axis. This may not be the "optimal" solution, but as shown in FIGS. 9*a*-9*c* which are based on this basic form, the results can be very good.

A more general solution can use variable power-shifters connected to the columns of sub-panels (the number of sub-panels being anywhere from two to the number of elements in a column) as well as phase-shifters, the variable power- and phase-shifter settings being independently controlled for different groups of sub-panels (at different nominally vertical locations) in the columns.

Figure 10A:
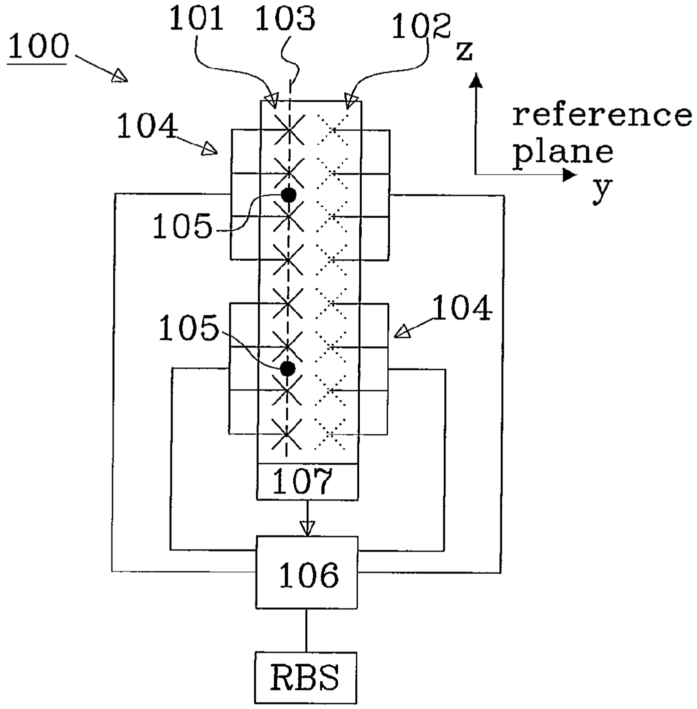
FIGS. 10*a*-10*c* show an implementation of the present invention to compensate for in-plane rotational motion.
Figure 10B:
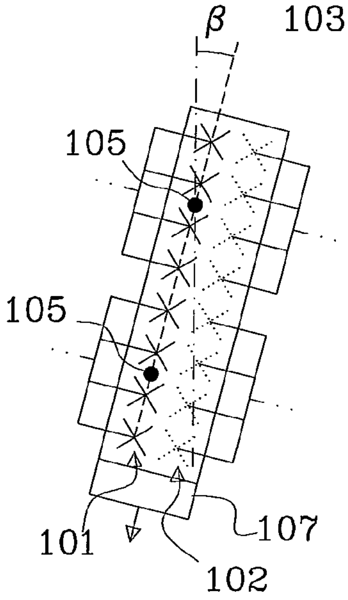
Figure 10C:
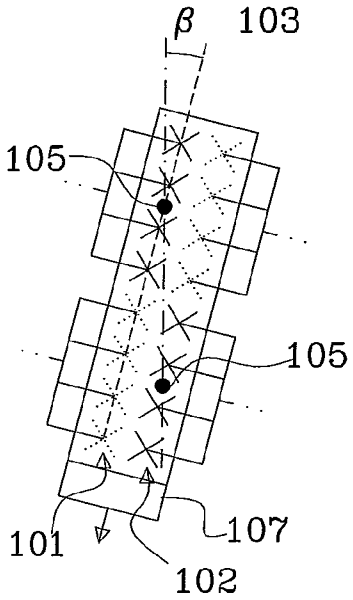

FIGS. 10*a-c* shows the antenna arrangements 100 corresponding to the results in FIGS. 9*a*-9*c*. The antenna arrangement 100 comprises two parallel columns 101, 102 arranged along a reference direction 103 (vertical direction) in the reference plane Ref defined by the y- and z-axis. Each column comprises two sub-panels 104 having four antenna elements each, and each active sub-panel has an aperture excitation centre point 105. The complete system is shown in FIG. 10*a*, comprising a distribution network 106 connected to each active and inactive sub-panel 104. A motion sensor 107 configured to detect an in-plane rotational motion is attached to the antenna arrangement 100. The distribution network comprises means to control the excitation of each sub-panel 104.

FIG. 10*a* shows an ideally installed antenna with single-column excitation (dark crosses, indicating active dipoles and dotted crosses indicating inactive dipoles). FIG. 10*b* shows a rotated ("rolled") antenna with single-column excitation. Rotation angle is β, as indicated.

FIG. 10*c* shows a rotated ("rolled") antenna with dual-column excitation producing effective vertical array of sub-panels (upper and lower half of antenna utilized as sub-panels with different columns being excited). The radiation beam pattern is compensated by selectively activating sub-panels 104 to obtain alignment of aperture excitation centre points 105 mainly along the vertical direction (z-axis).

The compensation is preferably performed based on detecting the physical motion "directly", rather than for example measuring phase slope on a difference beam.

In an alternative embodiment, an antenna arrangement suitable to compensate for in-plane rotational motion may be realized by providing a linear array of elements arranged along a vertical axis, with passive (parasitic) elements arranged along the vertical dimension on both sides of the antenna elements. The passive elements are equipped with switching means, e.g. diode or MEMS switches that change the electromagnetic properties of the passive elements. As an example, a lowest-order solution could involve having the switches turned off, with this implying that the passive elements are invisible, with the horizontal radiation pattern thus being produced by the antenna elements only, which could provide a sector beam, or having the switches turned on, implying that the passive elements are "resonant" (visible) with the horizontal pattern thus being produced by a combination of the antenna elements and the passive elements, which could produce a sector beam with different shape, for example wider than the original beam.

It should be noted that the invention also provide a method for aligning the antenna arrangement (during installation, calibration or reconfiguration) without the need for detecting the pointing direction of the antenna beam.

It should be noted that the invention is applicable to sub-panels having one or more antenna elements, and a column of antenna elements may comprise sub-panels having different number of antenna elements. A column may for instance comprise seven antenna elements, wherein the two antenna elements at the top are arranged in a first sub-panel, the next four antenna elements are arranged in a second sub-panel and the lowest antenna element constitutes a third sub-panel. With this type of arrangement comprising three sub-panels it is possible to produce elevation diagrams for 1, 2, 4, 5, 6 and 7 antenna elements (or groups of antenna elements) provided a suitable distribution network is realized, dependent on how adjacent sub-panels are combined.

The invention claimed is:

1. A method for adjusting a radiation beam pattern of an antenna of an antenna arrangement providing coverage in an area, said antenna comprising at least one array of antenna elements connected to a distribution network, said distribution network is configured to generate said radiation beam pattern, said method comprises:

arranging the antenna elements of said array in at least two parallel columns along a reference direction in an antenna plane, each column comprising multiple antenna elements arranged in at least two sub-panels, each sub-panel having multiple antenna elements and communicating through a common feed point with said distribution network;

detecting at least an in-plane rotational motion of the antenna in the antenna plane by a motion sensor configured to detect a deviation (β) from the reference direction, said motion sensor is arranged to the antenna; and compensating the generated radiation beam pattern based on the detected deviation (β) from the reference direction to maintain coverage in the area.

2. The method according to claim 1, wherein said step of compensating the radiation beam pattern comprises applying phase and/or amplitude taper in a nominal horizontal direction of the antenna, the taper being applied differently over the sub-panels in each column.

3. The method according to claim 1, wherein each sub-panel has an effective phase centre and said step of compensating the radiation beam pattern comprises selectively activating sub-panels to obtain alignment of effective phase centres mainly along the reference direction.

4. The method according to claim 1, wherein the antenna elements in at least one of said columns are parasitic antenna elements, the step of compensating the radiation pattern comprises changing the electromagnetic properties of the parasitic antenna elements.

5. The method according to claim 1, wherein said antenna plane being arranged in relation to a reference plane, and the method further comprises:

configuring the motion sensor to also detect deviation of the antenna elements relative the reference plane, and adjusting a beam shape of the radiation beam pattern based on the detected deviation of the antenna elements to maintain coverage of the area by controlling the distribution network.

6. The method according to claim 5, wherein the beam shape is adjusted by tapering excitation of the antenna elements on sub-panel basis.

7. The method according to claim 5, wherein said controlling of the distribution network to adjust the beam shape comprises: changing the number of active sub-panels in each column.

8. The method according to claim 7, wherein changing the number of active sub-panels in each column comprises dividing the antenna elements into another number of sub-panels.

9. The method according to claim 7, wherein changing the number of active sub-panels in each column comprises selectively activating at least one sub-panel.

10. The method according to claim 5, wherein said controlling of the distribution network to adjust the beam shape further comprises: changing the number of antenna elements in each sub-panel.

11. The method according to claim 5, wherein the method further comprises selecting the sub-panels of each column to have a fixed number of antenna elements.

12. The method according to claim 5, wherein the method comprises the additional step of generating at least one control signal for controlling the distribution network based on the detected deviation.

13. The method according to claim 1, wherein the motion sensor arranged to detect deviation of the antenna is attached to the antenna.

14. An antenna arrangement comprising an antenna for adjusting the radiation beam pattern, said antenna is configured to provide coverage in an area and comprises at least one array of antenna elements connected to a distribution network that is configured to generate said radiation beam pattern, the antenna elements of the array are arranged in at least two parallel columns along a reference direction in an antenna plane, each column comprising multiple antenna elements arranged in at least two sub-panels, each sub-panel having multiple antenna elements and communicating through a common feed point with said distribution network, characterized in that said antenna arrangement further comprises:

a motion sensor arranged to the antenna arrangement and configured to detect an in-plane rotational motion of the antenna in the antenna plane by detecting a deviation (β) from the reference direction, and means to compensate the generated radiation beam pattern based on the detected deviation (β) from the reference direction.

15. The antenna arrangement according to claim 14, wherein said antenna plane is arranged in relation to a reference plane, and the motion sensor further is configured to detect deviation of the antenna relative the reference plane, and the antenna arrangement further is provided with means to adjust a beam shape of the radiation beam pattern based on the detected deviation of the antenna to maintain coverage of the area by controlling the distribution network.

16. A base station, comprising:

an antenna arrangement comprising an antenna for adjusting the radiation beam pattern, said antenna is configured to provide coverage in an area and comprises at least one array of antenna elements connected to a distribution network that is configured to generate said radiation beam pattern, the antenna elements of the array are arranged in at least two parallel columns along a reference direction in an antenna plane, each column comprising multiple antenna elements arranged in at least two sub-panels, each sub-panel having multiple antenna elements and communicating through a common feed point with said distribution network, wherein said antenna arrangement further comprises:

a motion sensor arranged to the antenna arrangement and configured to detect an in-plane rotational motion of the antenna in the antenna plane by detecting a deviation (β) from the reference direction, and means to compensate the generated radiation beam pattern based on the detected deviation (β) from the reference direction.

17. A method for aligning an antenna of an antenna arrangement, wherein said antenna is configured to provide coverage in an area and comprises at least one array of antenna elements connected to a distribution network that is configured to generate a radiation beam pattern, the antenna elements of the array are arranged in at least two parallel columns along a reference direction in an antenna plane, each column comprising multiple antenna elements arranged in at least two sub-panels, each sub-panel having multiple antenna elements and communicating through a common feed point with said distribution network, wherein said antenna arrangement further comprises: (1) a motion sensor arranged to the antenna arrangement and configured to detect an in-plane rotational motion of the antenna in the antenna plane by detecting a deviation (β) from the reference direction, and (2) means to compensate the generated radiation beam pattern based on the detected deviation (β) from the reference direction, the method comprising:

determining a nominal vertical direction relative to said reference plane, and adjusting the radiation beam pattern of said antenna to obtain a desired main direction of the beam by controlling the distribution network.

18. The method according to claim 17, wherein the method further comprises performing said alignment to initiate the antenna arrangement during installation.

19. The method according to claim 17, wherein the method further comprises performing said alignment to calibrate the antenna arrangement.

20. The method according to claim 19, wherein the method further comprises performing said alignment to calibrate the antenna arrangement at regular intervals.

* * * * *

UNITED STATES PATENT AND TRADEMARK OFFICE

CERTIFICATE OF CORRECTION

PATENT NO. : 8,260,336 B2
APPLICATION NO. : 12/665627
DATED : September 4, 2012
INVENTOR(S) : Johansson et al.

It is certified that error appears in the above-identified patent and that said Letters Patent is hereby corrected as shown below:

In Column 6, Line 54, delete “twice a” and insert -- twice as --, therefor.

Signed and Sealed this
Twenty-seventh Day of November, 2012

David J. Kappos
*Director of the United States Patent and Trademark Office*